(12) United States Patent
Milano, Jr. et al.

(10) Patent No.: US 6,360,836 B1
(45) Date of Patent: Mar. 26, 2002

(54) ADD-ON DRIVE ASSEMBLY FOR BABY STROLLERS AND CARRIAGES

(75) Inventors: Arthur J. Milano, Jr., Burlington; Herman J. Parent, Winsted, both of CT (US)

(73) Assignee: Seitz Corporation, Torrington, CT (US)

( * ) Notice: Subject to any disclaimer, the term of this patent is extended or adjusted under 35 U.S.C. 154(b) by 0 days.

(21) Appl. No.: 09/675,661

(22) Filed: Sep. 29, 2000

(51) Int. Cl.[7] .............................................. B60K 1/00
(52) U.S. Cl. .................................. 180/65.6; 280/47.38
(58) Field of Search .............................. 280/11, 15, 16, 280/304.1, DIG. 907, 47.38; 180/65.1, 65.6, 295

(56) References Cited

U.S. PATENT DOCUMENTS

| | | | | |
|---|---|---|---|---|
| 2,448,992 A | * | 9/1948 | Love et al. ................ | 180/65.1 |
| 3,575,250 A | * | 4/1971 | Dykes ....................... | 180/11 |
| 3,955,639 A | * | 5/1976 | Cragg ....................... | 180/6.5 |
| 4,386,672 A | * | 6/1983 | Coker ....................... | 180/13 |
| 4,475,613 A | * | 10/1984 | Walker ...................... | 180/22 |
| 4,503,724 A | * | 3/1985 | Ward ........................ | 74/143 |
| 4,629,950 A | * | 12/1986 | Ching ....................... | 318/285 |
| 4,759,418 A | * | 7/1988 | Goldenfeld et al. ....... | 180/65.1 |
| 4,961,473 A | * | 10/1990 | Jones ....................... | 180/65.1 |
| 5,161,630 A | * | 11/1992 | Garin, III et al. .......... | 180/65.2 |
| 5,275,248 A | * | 1/1994 | Finch et al. ............... | 180/65.6 |
| 5,291,959 A | * | 3/1994 | Malblanc ................... | 180/11 |
| 5,350,032 A | * | 9/1994 | Smith ....................... | 180/65.6 |
| 5,494,126 A | * | 2/1996 | Meeker ..................... | 180/13 |
| 5,873,425 A | * | 2/1999 | Yang ........................ | 180/65.6 |
| 5,937,961 A | * | 8/1999 | Davidson .................. | 180/166 |

FOREIGN PATENT DOCUMENTS

| | | | | |
|---|---|---|---|---|
| WO | WO 93/24342 | * | 12/1993 | 180/65.6 |

* cited by examiner

*Primary Examiner*—Brian L. Johnson
*Assistant Examiner*—G B Klebe
(74) *Attorney, Agent, or Firm*—Dallett Hoopes

(57) ABSTRACT

For a baby stroller, an add-on assembly comprises a planar rectangular chassis pivotally attached to the stroller rear axle and carrying on its distal end a drive shaft with wheels. The chassis also mounts an electric motor having a spur gear engaging a ring gear in one of the wheels. At least one strut is connected at one end to the structure of the stroller well above the axle and at the other end to the rear of the chassis. The strut holds the chassis downward so that the drive wheels engage the pavement, supplanting the stroller rear wheels. Battery and controls for the motor are included.

10 Claims, 3 Drawing Sheets

US 6,360,836 B1

ADD-ON DRIVE ASSEMBLY FOR BABY STROLLERS AND CARRIAGES

FIELD OF THE INVENTION

This invention relates to an add-on drive assembly for baby strollers, baby carriages and the like to assist in propelling the vehicle, for instance, up hills or over rough terrain.

BACKGROUND OF THE INVENTION

Strollers and baby carriages of both the fixed and collapsible type are normally easy to propel. With some loads, however, and with even lighter loads up hills or over rough terrain, the need for the assistance of drive means has been felt.

SUMMARY OF THE INVENTION

The present invention is an add-on device for a conventional stroller or baby carriage which includes drive wheels which may be positioned below, that is, at a lower level, drive wheels engage the sidewalk frictionally and raise the ordinary stroller rear wheels above the pavement to an inactive position.

Thus, for a baby stroller or baby carriage, the invention is an add-on drive assembly. It comprises a planar rectangular chassis adapted to be pivotally attached to the stroller rear axle and carrying on its distal end its own drive shaft with drive wheels. The chassis also mounts an electric motor having a spur gear engaging a ring gear in adjacent drive wheel. Adjustable struts are provided, each having one end attached to the structure of the stroller well above the carriage axle and the other end attached to the rear of the chassis. The struts can selectively be in fixed attachment to hold the distal end of the chassis downward so that the drive wheels engage the pavement, supplanting the stroller rear wheels. Battery and controls for the motor are included.

"Stroller" herein is taken to include baby carriages and various other forms of infant- or child-bearing vehicles normally propelled by hand.

"Stroller" herein is taken to include baby carriages and various other forms of infant- or child-bearing vehicles normally propelled by hand.

BRIEF DESCRIPTION OF THE DRAWINGS

Further objects and features of the invention will be clear to those skilled in the art from a review of the following specification and drawings, all of which present a non-limiting form of the invention. In the drawings.

DESCRIPTION OF THE PREFERRED EMBODIMENT

Figure 1:
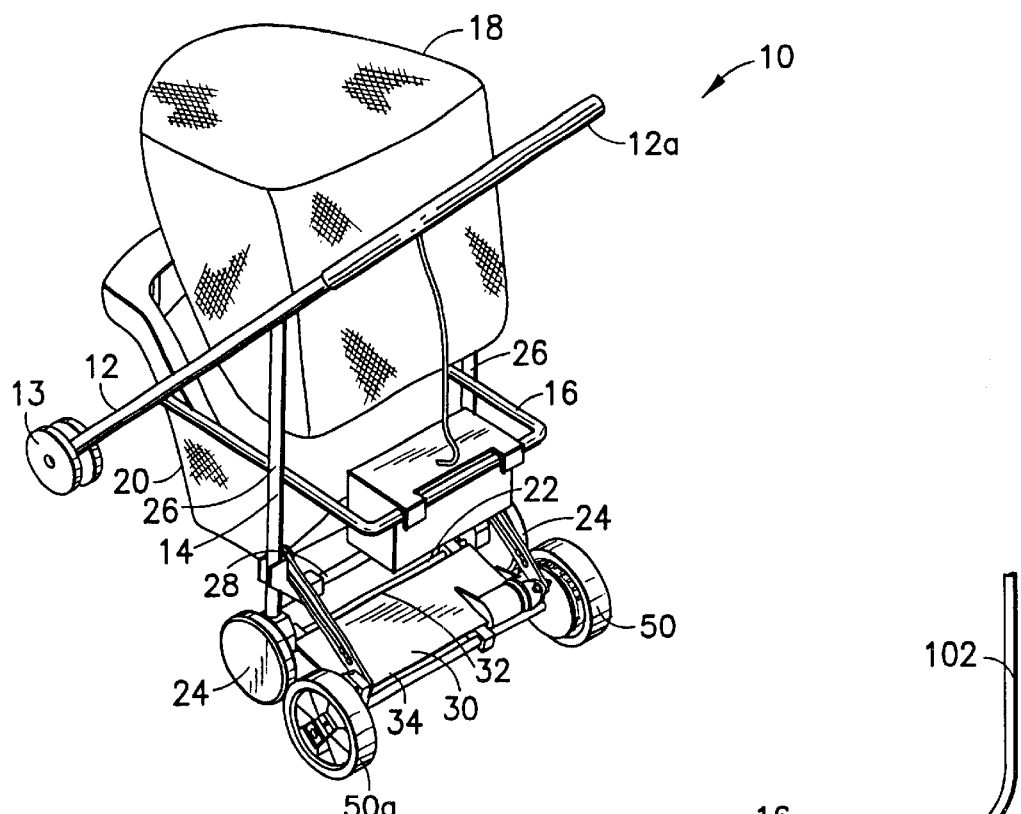
FIG. 1 is a perspective view of a stroller fitted with a drive assembly embodying the invention.

A stroller embodying the invention is shown in simplified form in FIG. 1 and generally designated 10. It comprises a forward tubular member 12 having wheels 13 on each lower end and the usual push bar 12a and a rear connected tubular member 14. Connecting the forward and rear members is a horizontal tubular reinforcing member 16. Various fabric portions 18 and 20 are shown in the simplified representation as is well known in the art. The rear tubular member 14 comprises a U-shaped frame defined by a rear axle 22 having a freely rotatable wheel 24 at either end. A pair of upright side elements 26 extend upward form suitable axle bearings 27, and are spaced and generally parallel. A bridging element 28 connects the two side elements 26 and holds them firmly in proper relation.

The unit as described above is well known in the art including structures which may be converted from a horizontal bed as a baby carriage for an infant to a relatively upright fabric chair for a young child. The parts are described and shown in simplified form, the details being readily accessible to virtually everyone.

Figure 2:
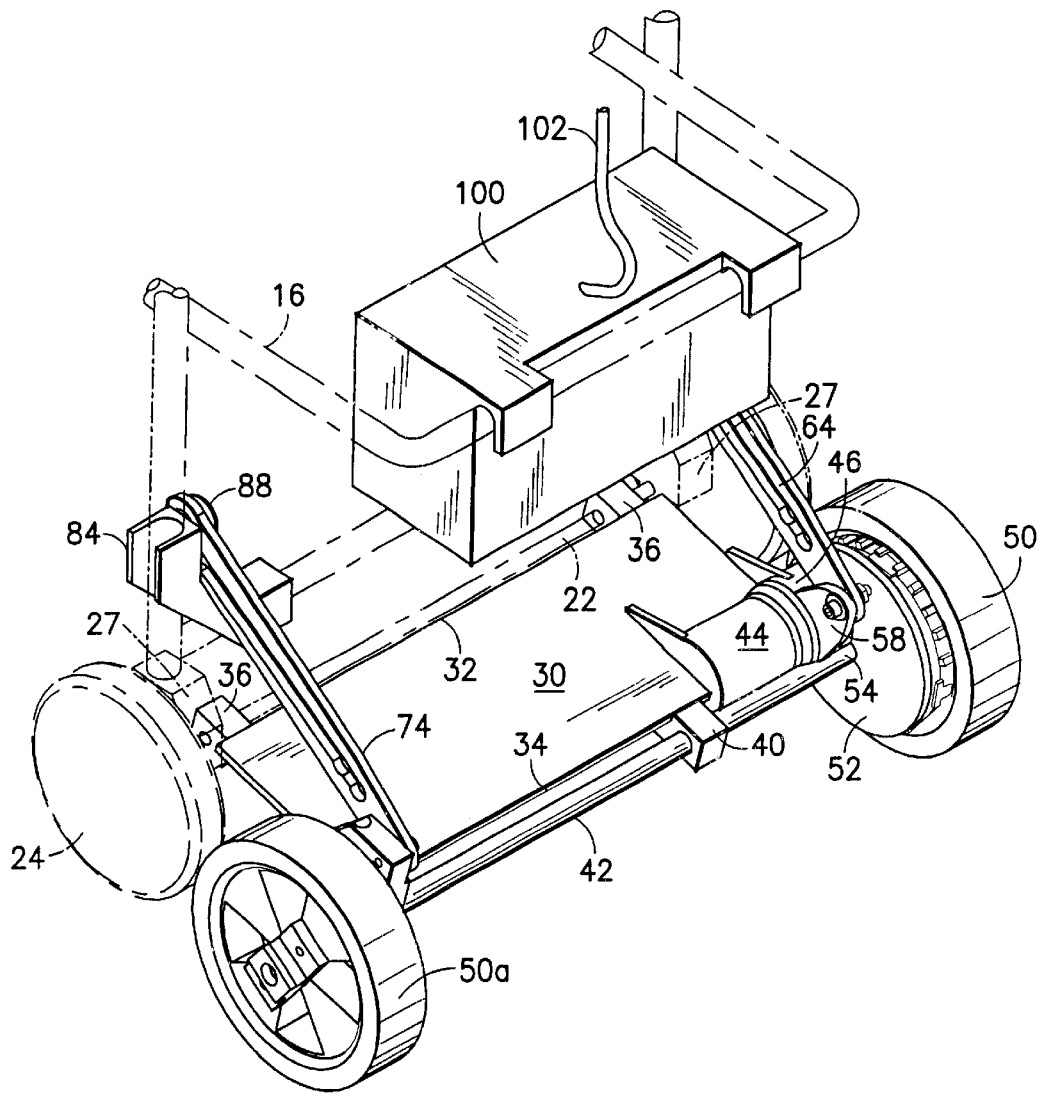
FIG. 2 is an enlarged perspective view of the motorized add-on with the adjoining structure of the stroller/carriage shown in broken lines.

The invention is a drive assembly which is readily attachable to any one of a number strollers exemplified by the structure shown and described thus far. It comprises a chassis 30 which may be in the form of a generally rectangular plate having a forward edge 32 and a rearward or distal edge 34. The forward edge (FIG. 2) is attached to the rear axle 22 of the stroller by means of hook-like appendages 36 widely spaced along the edge 32. Locking pins 38 (FIG. 3) are slipped into appropriate openings in the hook-like appendages 36 to lock the appendages in place over the axle 22.

Also clamped on the rear edge 34 of the chassis 30 is the electric motor 44 which may include a reduction gear portion 46. The motor has a shaft parallel to the drive shaft 42 and carries an outward spur gear 48. Drive wheels 50 are secured to the opposite ends of drive shaft 42 at their centers so that they rotate together. Various washers and wheel locking pins are included in the assembly.

The motor is provided at its outer end with a circular guard 52 which is centrally apertured at 54, and the shaft 42 passes therethrough and is rotatable therein. The rightward wheel 50 is provided with an internal ring gear 56 which meshes with the spur 48 so that, as the motor rotates, it drives the wheels.

The motor is provided with an upward flange 58 which is apertured, and a bolt 60 extends through the apertures and is received by an opening 62 in strut 64 to link the strut and flange. The strut is formed with an elongate slot 66. The upper portion of the bearing 40a also carries a horizontal bolt 68 which is received into the opening 72 of the parallel strut 74 to link the strut and bearing. The strut 74 is formed with an elongate slot 76.

Figure 3:
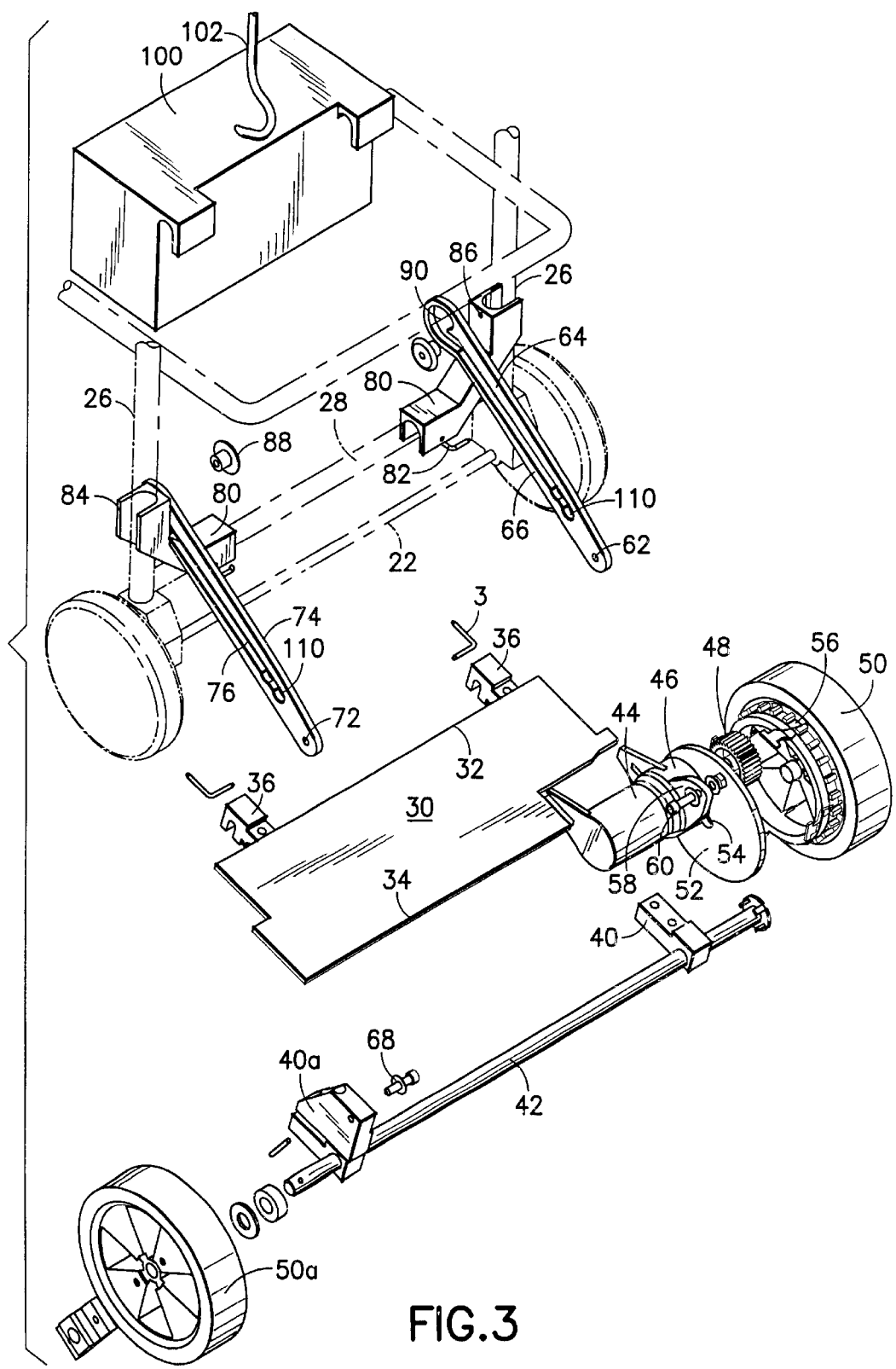
FIG. 3 is an exploded perspective view of the motorized add-on with the adjoining structure of the carriage shown in broken lines.

Also part of the add-on drive assembly are a pair of generally L-shaped channels 80 which are secured by means (partly not shown) at the respective intersections of the side elements 26 and the bridge element 28. The L-shaped channels 80 face inwardly and are held in position by L-shaped pins 82 which extend through apertures in a lower portion of each of the L-shaped channels 80 to entrap the bridge element 28. The upright portions 84 of the L-shaped channels 80 are apertured in a center portion at 86, tapped and receive threaded thumb bolts 88 which pass through the respective slots 66, 76 and, when tightened, fix the length between the bolts 88 and the bolts 60, 68. Preferably, the slots 66, 67 terminate in upward offsets 90 (one of which is shown in FIG. 3) so that when the struts 64, 74 are all the way extended, the upper ends of the struts drop so that the bolts 88 rest in the upward offset. This firmly fixes the disposition of the chassis 30 in the engaged position so that wheels 50, 50a (FIG. 4) are below the regular wheels 24 (FIG. 4).

A storage battery 100 is provided and electrically connected to the motor 44 and supported on the member 16. A rheostat in the battery box controls the amount of voltage conducted to the motor 44 through electrical wiring, not shown. The control (not shown) for the rheostat may be positioned at the upper end of the bar 12a (FIG. 1), and is connected to the rheostat through a Bowden wire 102. It is operated by the user to control the speed of the motor and, hence, the speed of the drive wheel 50, 50a.

Figure 4:
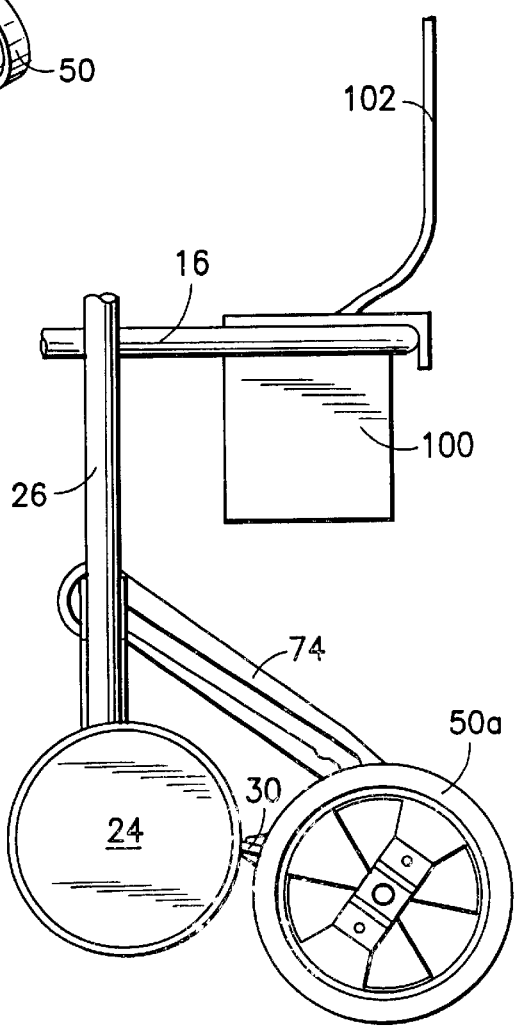
FIG. 4 is a side view of the rear portion of the motorized carriage with the motorized add-on shown in engaged position.

The stroller may be pushed in the usual way even if the wheels are in the down position shown in FIG. 4. The spinning of the wheels 50, 50a and the spinning of the connected motor shaft through the spur 48 offer relatively little drag.

When it is desired to remove the wheels 50, 50a from service, it is merely necessary to loosen the thumb bolts 88, lift the forward ends of the struts 64, 74 and pivot the chassis 30 up about the axle 22. At the uppermost position of the wheels, the thumb screws will align with the enlargements 110 (FIG. 3) of the slots 66, 76 and the thumb screws can be tightened with the upper ends of the struts 64, 74 extending upwardly.

A variation of the described invention may be an embodiment in which the shaft 42 is fixed and the wheels 50, 50a rotate free with respect thereto. In this embodiment, of course, only the right wheel 50 will be activated by the spur 48.

Variations in the invention are thus contemplated. While the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. An add-on drive assembly for a stroller having a U-shaped frame defined by a rear axle having an idler wheel at either end, a pair of spaced upright side elements connected to the axle, and a bridging element spaced above the axle and connected to the respective side elements, the assembly comprising:
   a. a planar generally rectangular chassis having a forward edge having pivot connectors adapted to connect to the axle, and a distal edge mounting an electric motor having a horizontal drive shaft parallel to the forward edge with a drive spur gear extending outward from the chassis,
   b. a controllable electric power source adapted to be supported by the stroller and electrically connected to the motor,
   c. a horizontal drive wheel shaft mounted on the distal edge of the chassis,
   d. a drive wheel mounted on an end of the drive wheel shaft, the drive wheel having an internal ring gear meshing with the spur gear,
   e. a support strut pivotally connected at one end to the distal edge of the chassis and the other end adapted to be connected to the U-shaped frame above the axle.

2. A drive assembly as claimed in claim 1 including additionally an L-shaped channel fixture embracing the connection between one of the side elements and the bridging element and providing a connection for the one end of the strut.

3. A drive assembly as claimed in claim 1 wherein connections of the strut are secured at a distance apart such that the frame is raised, raising the idler wheels.

4. A drive assembly as claimed in claim 1 wherein the drive wheel shaft is free to turn on its mounting and fixedly mount the drive wheel and a second drive wheel fixedly mounted on an opposite end of the drive shaft.

5. A drive assembly as claimed in claim 1 wherein the motor includes a reduction gear.

6. An motorized stroller comprising:
   a. a U-shaped frame defined by a rear axle having an idler wheel at either end, a pair of spaced upright side elements connected to the axle, and a bridging element spaced above the axle and connected to the respective side elements,
   b. a planar generally rectangular chassis having a forward edge pivotally connected to the axle and a distal edge mounting an electric motor having a drive shaft parallel to the axle with a drive spur gear extending outward from the chassis,
   c. a controllable electric power source supported by the stroller and electrically connected to the motor,
   d. a drive wheel shaft mounted on the distal edge of the chassis and parallel to the axle,
   e. a drive wheel mounted on an end of the drive wheel shaft, the drive wheel having an internal ring gear meshing with the spur gear,
   f. a support strut pivotally connected at one end to the distal edge of the chassis and at the other end to the U-shaped frame above the axle, one of the connections being releasable.

7. A motorized stroller as claimed in claim 6 including additionally an L-shaped channel fixture embracing the connection between one of the side elements and the bridinge element and providing a connection for the one end of the strut.

8. A motorized stroller as claimed in claim 6 wherein connections of the strut are secured at a distance apart such that the frame is raised, raising the idler wheels.

9. A motorized stroller as claimed in claim 6 wherein the drive wheel shaft is free to turn on its mounting and fixedly mount the drive wheel and a second drive wheel fixedly mounted on an opposite end of the drive shaft.

10. A motorized stroller as claimed in claim 6 wherein the motor includes a reduction gear.

* * * * *